US012793397B2

(12) United States Patent
Sivakumar et al.

(10) Patent No.: US 12,793,397 B2
(45) Date of Patent: Nov. 10, 2026

(54) IDENTIFYING ANOMALIES BASED ON CONTOURS DETERMINED THROUGH FALSE POSITIVES

(71) Applicant: International Business Machines Corporation, Armonk, NY (US)

(72) Inventors: Gandhi Sivakumar, Bentleigh (AU); Nikhil Sai Krishna Jonnavithula, Visakhapatnam (IN); Prasanth Gelli, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 18/157,958

(22) Filed: Jan. 23, 2023

(65) Prior Publication Data

US 2024/0249509 A1 Jul. 25, 2024

(51) Int. Cl.

| | |
|---|---|
| ***G06V 10/776*** | (2022.01) |
| ***G06F 18/21*** | (2023.01) |
| ***G06F 18/23213*** | (2023.01) |
| ***G06N 3/08*** | (2023.01) |
| ***G06N 20/00*** | (2019.01) |
| ***G06T 19/20*** | (2011.01) |

(52) U.S. Cl.

CPC ........... *G06V 10/776* (2022.01); *G06N 20/00* (2019.01); *G06F 18/217* (2023.01); *G06F 18/23213* (2023.01); *G06N 3/08* (2013.01); *G06T 19/20* (2013.01)

(58) Field of Classification Search

CPC ........ G06V 10/776; G06N 20/00; G06N 3/08; G06F 18/217; G06F 18/23213; G06T 19/20

See application file for complete search history.

(56) References Cited

U.S. PATENT DOCUMENTS

| | | | | |
|---|---|---|---|---|
| 8,688,603 | B1 * | 4/2014 | Kurup | G06N 20/10 706/12 |
| 9,727,723 | B1 | 8/2017 | Kondaveeti et al. | |
| 10,832,248 | B1 | 11/2020 | Kramme et al. | |
| 10,929,217 | B2 | 2/2021 | Kukreja et al. | |
| 11,409,594 | B2 | 8/2022 | Turek et al. | |
| 2015/0170056 | A1 * | 6/2015 | Breckenridge | G06N 20/00 |
| 2020/0050968 | A1 * | 2/2020 | Lee | G06N 20/00 |
| 2020/0103886 | A1 * | 4/2020 | Gandenberger | G05B 23/0283 |

(Continued)

OTHER PUBLICATIONS

Chakraborty, et al, "Building an Automated and Self-Aware Anomaly Detection System", IEEE International Conference on Big Data, 2020, pp. 1465-1475.

(Continued)

*Primary Examiner* — Quoc A Tran

(74) *Attorney, Agent, or Firm* — Cantor Colburn LLP; Rakesh Roy

(57) ABSTRACT

Computer-implemented methods for identifying anomalies in a trained prediction model are provided. Aspects include receiving an input data set and obtaining a prediction from the trained prediction model based on the input data set. Aspects also include receiving, from a subject matter expert, a determination that the prediction is a false positive and creating a false positive contour based on the input data set. Aspects further include adding the false positive contour to a false positive feature space for the trained prediction model.

20 Claims, 6 Drawing Sheets

(56) References Cited

U.S. PATENT DOCUMENTS

| | | | | |
|---|---|---|---|---|
| 2021/0344695 | A1* | 11/2021 | Palani | G06F 16/285 |
| 2023/0110056 | A1* | 4/2023 | Gullikson | G05B 23/024<br>700/80 |

OTHER PUBLICATIONS

Lindemann, et al, "Anomaly detection in discrete manufacturing using self-learning approaches", Elsevier, Procedia CIRP 79, 2019, pp. 313-318.
Self-Learning Optimisation, https://www.pelican.ai/solutions/pelican-secure/self-learning-optimization, (Retrieved: Jan. 18, 2023), 8 pages.
Wang, et al, "adVAE: a Self-adversarial Variational Autoencoder with Gaussian Anomaly Prior Knowledge for Anomaly Detection", arXiv preprint, 2019, 16 pages.
Zenati, et al, "Adversarially Learned Anomaly Detection", IEEE International Conference on Data Mining, 2018, pp. 727-736.

* cited by examiner

IDENTIFYING ANOMALIES BASED ON CONTOURS DETERMINED THROUGH FALSE POSITIVES

BACKGROUND

The present invention generally relates to identifying anomalies in a machine learning model, and more specifically, to computer systems, computer-implemented methods, and computer program products for identifying anomalies based on contours determined through false positives.

The use of machine learning-based prediction systems has drastically increased in recent years. Such systems are often used in a wide variety of industries, such as the medical and financial industries. In general, machine learning-based prediction systems include a trained model that is applied to a set of input data to make a prediction regarding the data set. For example, in the medical industry, a machine learning-based prediction system may receive patient data and make a predicted diagnosis of a medical condition for the patient. One area of particular concern with machine learning-based prediction systems is the generation of inaccurate prediction, in particular the generation of false positive results.

SUMMARY

Embodiments of the present invention are directed to a computer-implemented method for identifying anomalies in a trained prediction model is provided. According to an aspect, a computer-implemented method includes receiving an input data set and obtaining a prediction from the trained prediction model based on the input data set. The method also includes receiving, from a subject matter expert, a determination that the prediction is a false positive and creating a false positive contour based on the input data set. The method further includes adding the false positive contour to a false positive feature space for the trained prediction model.

According to another non-limiting embodiment of the invention, a system having a memory having computer readable instructions and one or more processors for executing the computer readable instructions, the computer readable instructions controlling the one or more processors to perform operations. The operations include receiving an input data set and obtaining a prediction from the trained prediction model based on the input data set. The operations also include receiving, from a subject matter expert, a determination that the prediction is a false positive and creating a false positive contour based on the input data set. The operations also include adding the false positive contour to a false positive feature space for the trained prediction model.

According to another non-limiting embodiment of the invention, a computer program product for identifying anomalies in a trained prediction model is provided. The computer program product includes a computer-readable storage medium having program instructions embodied therewith, the program instructions executable by a processor to cause the processor to perform operations. The operations include receiving an input data set and obtaining a prediction from the trained prediction model based on the input data set. The operations also include receiving, from a subject matter expert, a determination that the prediction is a false positive and creating a false positive contour based on the input data set. The operations also include adding the false positive contour to a false positive feature space for the trained prediction model.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
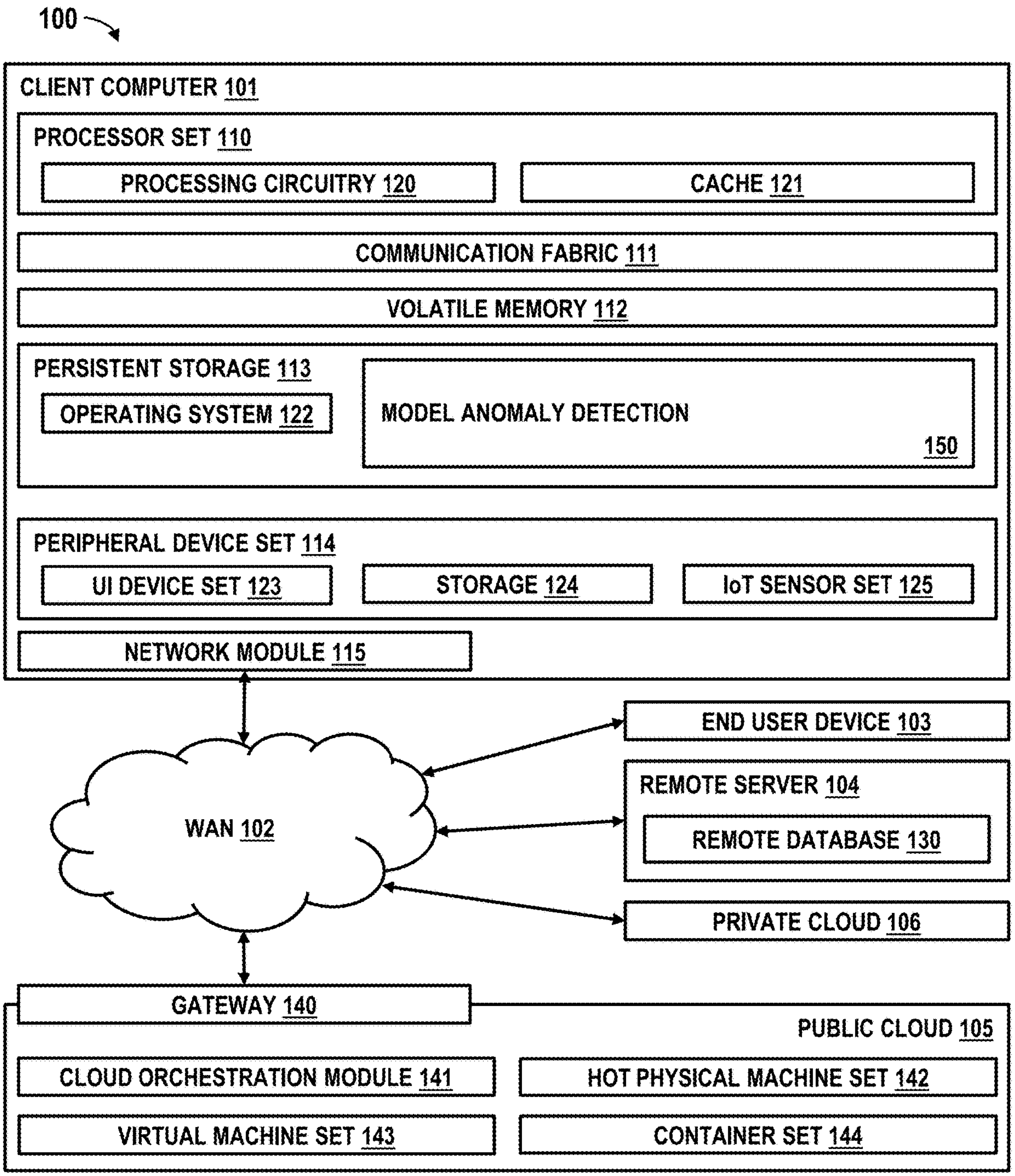
FIG. 1 depicts a block diagram of an example computer system for use in conjunction with one or more embodiments of the present invention.

As discussed above, an area of particular concern with machine learning-based prediction systems is the generation of inaccurate prediction, in particular the generation of false positive results. In exemplary embodiments, a false positive prediction of a trained prediction model is identified, for example by a subject matter expert. Once the false positive prediction is identified, a false positive contour is created based on the input data set associated with the false positive prediction. The false positive contour is added to a set of previously identified contours to update a false positive feature space. In an exemplary embodiment, future predictions created by the trained prediction model are analyzed against the false positive feature space to identify whether the generated prediction may be a false positive.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as model anomaly detection 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks, such as generating a predicted medical diagnosis or predicting a approval decision on a loan application. More specifically, one or more embodiments described herein can incorporate and utilize rule-based decision making and artificial intelligence (AI) reasoning to accomplish the various operations described herein, namely containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks, such as generating a predicted medical diagnosis or predicting a approval decision on a loan application. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks, such as generating a predicted medical diagnosis or predicting a approval decision on a loan or credit application, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks, such as generating a predicted medical diagnosis or predicting an approval decision on a loan or credit application as described herein.

Figure 2:
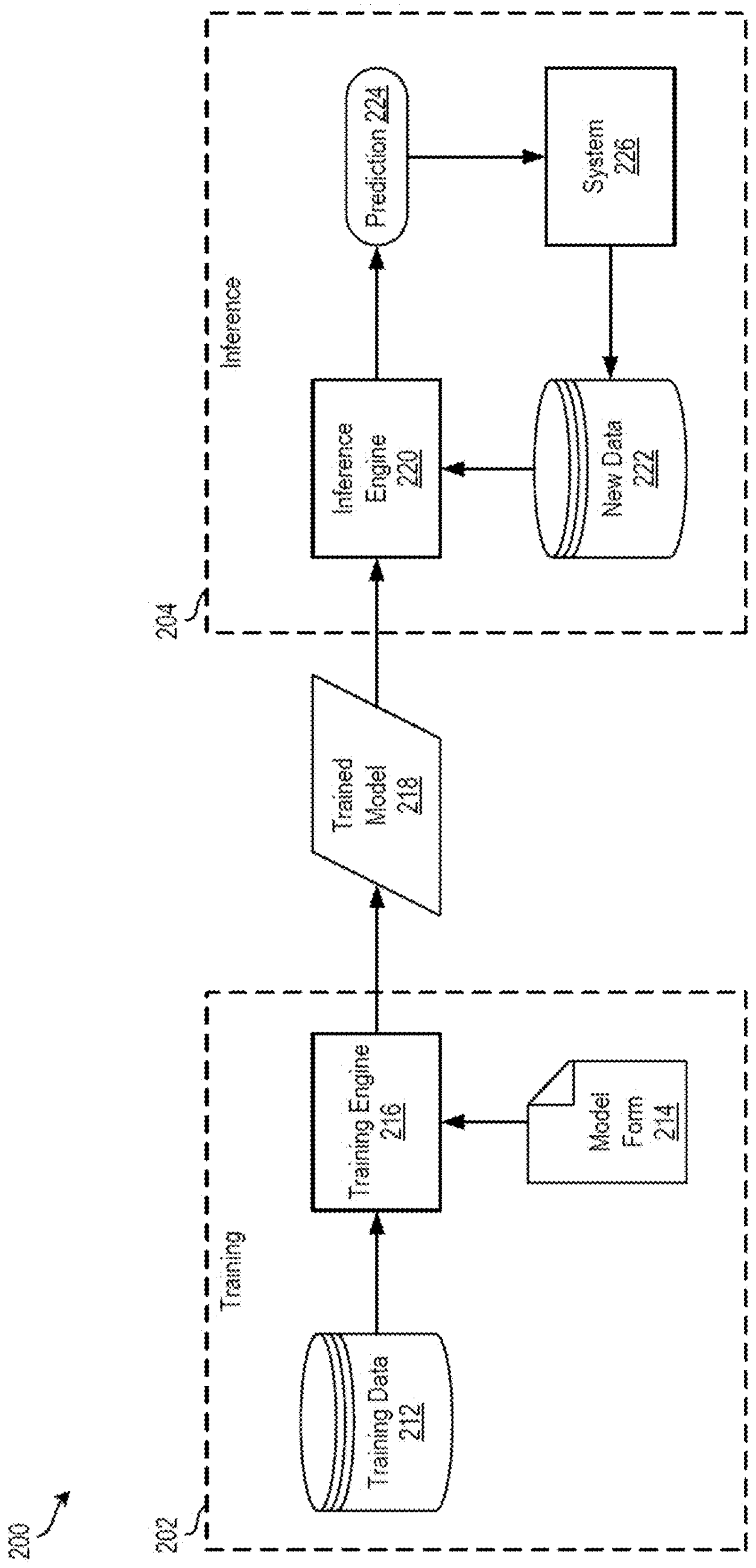
FIG. 2 depicts a block diagram of components of a machine learning training and inference system in accordance with one or more embodiments of the present invention.

Systems for training and using a machine learning model are now described in more detail with reference to FIG. 2. Particularly, FIG. 2 depicts a block diagram of components of a machine learning training and inference system 200 according to one or more embodiments described herein. The system 200 performs training 202 and inference 204. During training 202, a training engine 216 trains a model (e.g., the trained model 218) to perform a task, such as to generating a predicted medical diagnosis or predicting an approval decision on a loan or credit application. Inference 204 is the process of implementing the trained model 218 to perform the task, such as to generate a predicted medical diagnosis or predict an approval decision on a loan or credit application, in the context of a larger system (e.g., a system 226). All or a portion of the system 200 shown in FIG. 2 can be implemented, for example by all or a subset of the computing environment 100 of FIG. 1.

The training 202 begins with training data 212, which may be structured or unstructured data. According to one or more embodiments described herein, the training data 212 includes a corpus of medical data and associated diagnoses and/or a corpus of financial user data associated load/credit application decisions. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 may be a model form of a CNN. The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 may be performed multiple times (referred to as "epochs") until a suitable model is trained (e.g., the trained model 218).

Once trained, the trained model 218 can be used to perform inference 204 to perform a task, such as to generate a predicted medical diagnosis or predict an approval decision on a loan or credit application The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments, the system 226 can add to and/or modify the new data 222 based on the prediction 224.

In accordance with one or more embodiments, the predictions 224 generated by the inference engine 220 are periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

Figure 3:
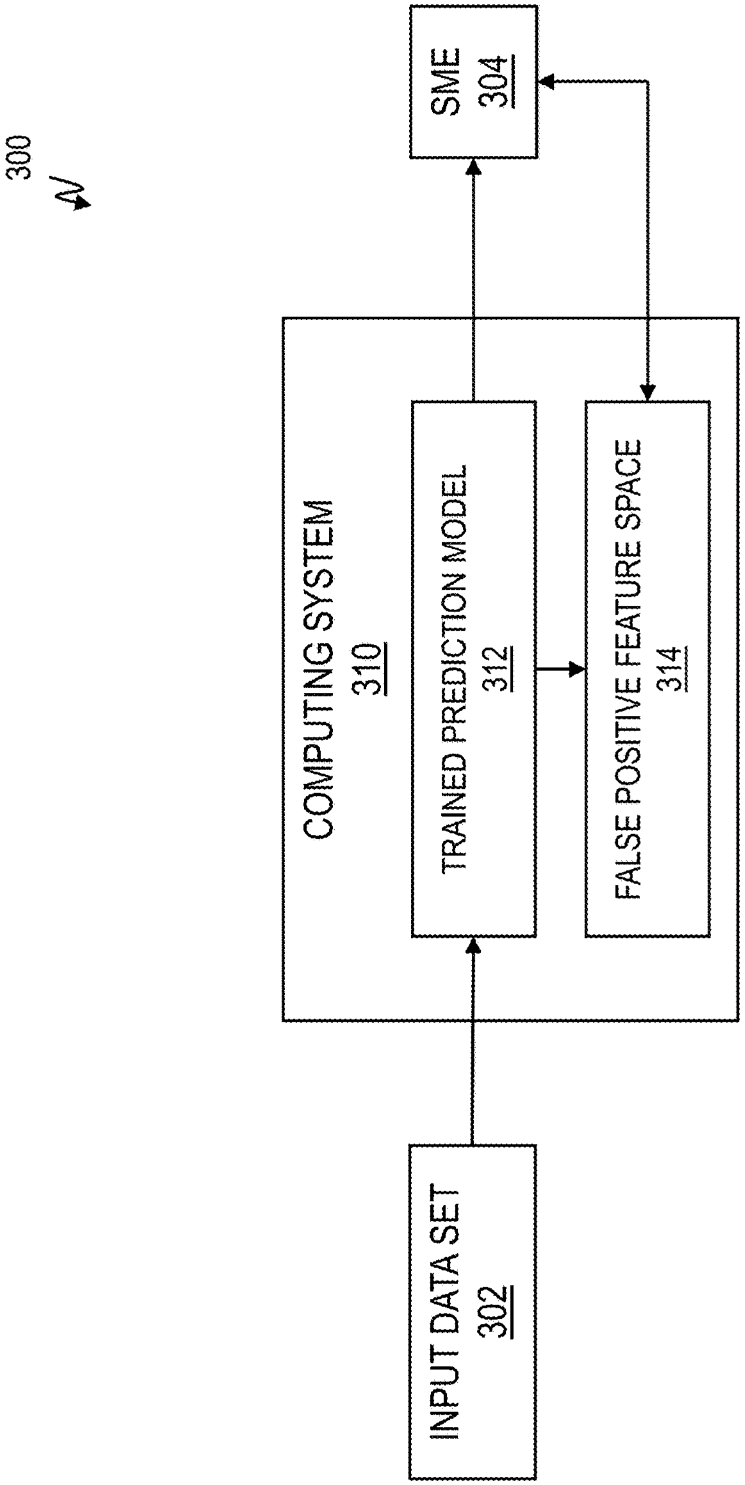
FIG. 3 is a block diagram of a system for identifying anomalies in a trained prediction model in accordance with one or more embodiments of the present invention.

Referring now to FIG. 3, a system 300 for identifying anomalies in a trained prediction model 312 in accordance with one or more embodiments of the present invention is shown. As illustrated, the system 300 includes a computing system 310 that includes a trained prediction model 312 and a false positive feature space 314. All or a portion of the computing system 310 shown in FIG. 3 can be implemented, for example by all or a subset of the computing environment 100 of FIG. 1. In exemplary embodiments, the computing system 310 is configured to receive an input data set 302 and to provide the input data set 302 to the trained prediction model 312. The trained prediction model 312 is configured to create a prediction corresponding to the input data set 302. In one embodiment, the prediction is provided to a subject matter expert (SME) 304 that analyses the prediction and the input data set 302 to determine whether the prediction is accurate. Based on a determination that the prediction is not accurate, more specifically based on determining that the prediction is a false positive prediction, the SME 304 provides an indication of the false positive to the computing system 310. In one embodiment, the indication provided by the SME 304 includes one or more features from the input data 302 that were the basis for the determination by the SME 304 that the prediction was a false positive. In exemplary embodiments, the computing system 310 is configured to create and/or update a false positive feature space 314 based on the one or more features from the input data 302 that were the basis for the determination by the SME 304 that the prediction was a false positive.

In exemplary embodiments, after a false positive feature space 314 has been created by the computing system 310 for a trained prediction model 312, the computing system 310 may analyze future positive predictions of the trained prediction model 312 using the false positive feature space 314 prior to providing the prediction to the SME 304. In this embodiment, the computing system 310 will provide the SME 304 with the prediction and an indication as to whether the prediction falls within the existing false positive feature space 314. Furthermore, the computing system 310 is configured to update the false positive feature space 314 based on input received from the SME 304.

Figure 4:
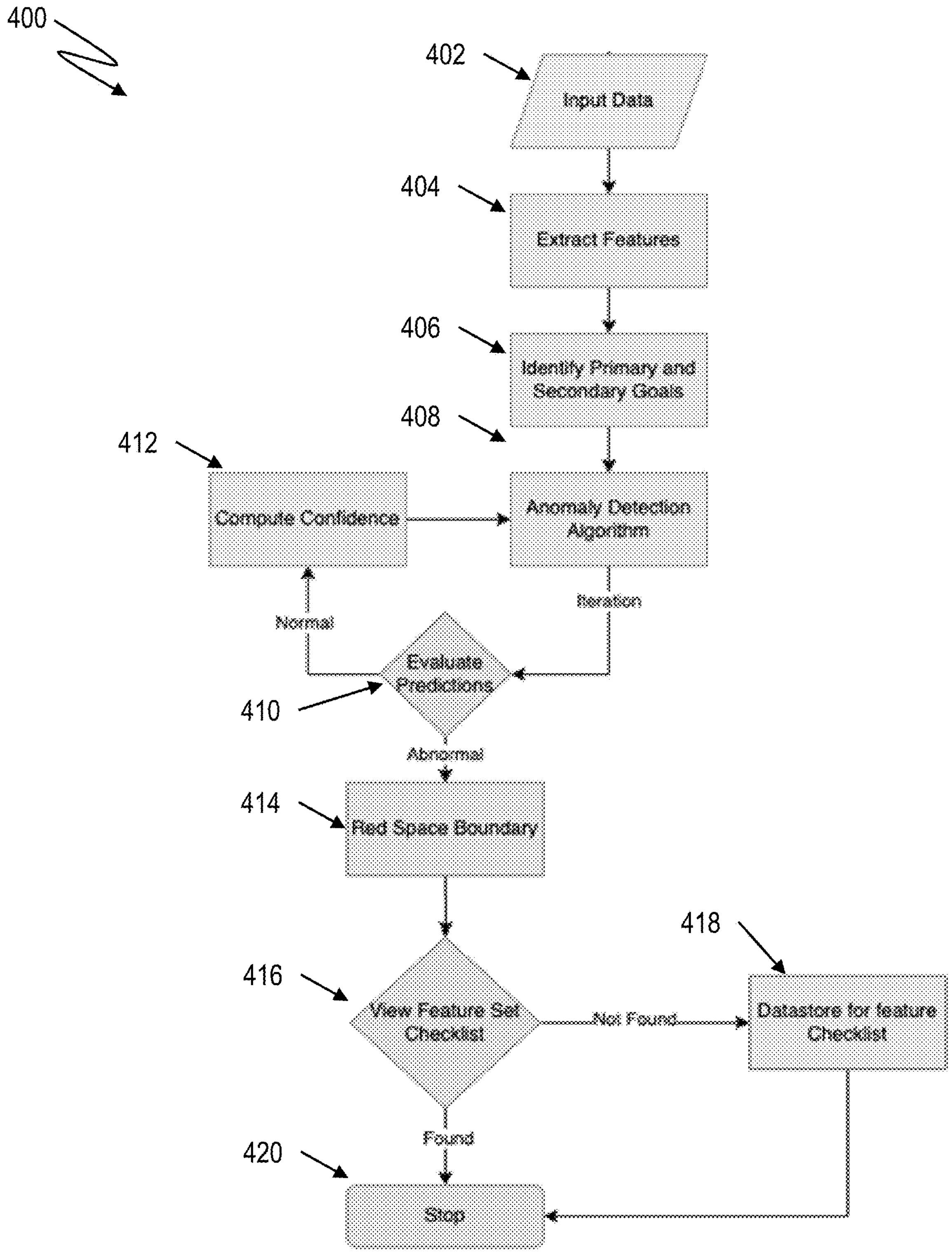
FIG. 4 is a flowchart of a method for identifying anomalies in a trained prediction model in accordance with one or more embodiments of the present invention.

Referring now to FIG. 4, a flowchart of a method 400 for identifying anomalies in a trained prediction model in accordance with one or more embodiments of the present invention is shown. As shown at block 402, the method 400 includes receiving an input data set. Next, at block block 404, the method 400 includes extracting one or more features from the input data set. The method 400 also includes identifying primary and secondary goals for prediction by the trained prediction model and creating a prediction for each goal, as shown at block 406. Next, as shown at block 408, the method includes performing an anomaly detection algorithm. In one embodiment, the anomaly detection algorithm is configured to identify and discard erroneous or inaccurate input data using any of a variety of known techniques. In another embodiment, the anomaly detection algorithm is configured to identify anomalous predictions for the primary and secondary goals.

Next, as shown at decision block 410, the method 400 includes evaluating the predictions to determine if the predictions for the primary and/or secondary goals are accurate. Based on a determination that the predictions for the primary and/or secondary goals are accurate, the method 400 proceeds to block 412 and computes a confidence score for the predictions. Based on a determination that the predictions for the primary and/or secondary goals are not accurate, the method 400 proceed to block 414 and creates a red space boundary, or false positive contour, associated with the prediction. In exemplary embodiments, the determination that the predictions for the primary and/or secondary goals are not accurate includes a determination that one of the predictions is a false positive prediction. The determination that the predictions for the primary and/or secondary goals are not accurate is made by a subject matter expert.

Once the red space boundary has been created, the method 400 proceeds to decision block 416 and determines whether a feature set checklist associated with a false positive feature space of the trained model includes the false positive contour associated with the false positive prediction. If the false positive feature space of the trained model includes the false positive contour associated with the false positive prediction, the method 400 proceeds to block 420 and ends. Otherwise, the method 400 proceeds to block 418 and adds the false positive contour to the false positive feature space by adding a feature set checklist of the false positive prediction to a datastore.

Figure 5:
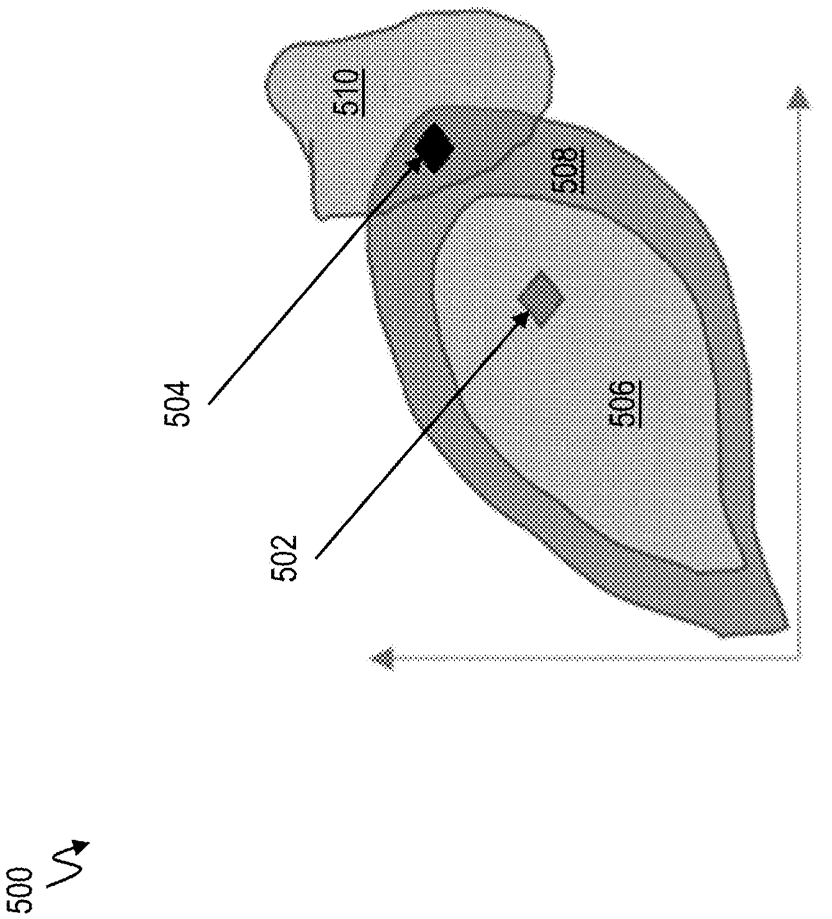
FIG. 5 is a graph showing a feature space of a trained prediction model and a contour of an anomaly of the trained prediction model in accordance with one or more embodiments of the present invention.

Referring now to FIG. 5, a graph showing a feature space 500 of a trained prediction model and a contour of an anomaly of the trained prediction model in accordance with one or more embodiments of the present invention is shown. As illustrated the feature space 500 includes a positive prediction space 506 of a trained prediction model. The positive prediction space 506 includes a threshold portion 508 that indicates a boundary of the positive prediction space 506. In exemplary embodiments, a trained prediction model is configured to receive an input data source and to create a prediction that can be mapped to the feature space 500. In exemplary embodiments, a prediction 502 that is within the positive prediction space 506 is associated with a positive prediction. Likewise, prediction 504 which is located within the threshold portion 508 is associated with a positive prediction. In exemplary embodiments, the feature space 500 also includes a false positive contour 510, also referred to as a false positive feature space 510. The false positive contour 510 is associated with a false positive prediction 504 that is located within the positive prediction space 506. In exemplary embodiments, the false positive feature space 510 is created and/or updated based on an identification by a subject matter expert that the prediction 504 is a false positive.

Figure 6:
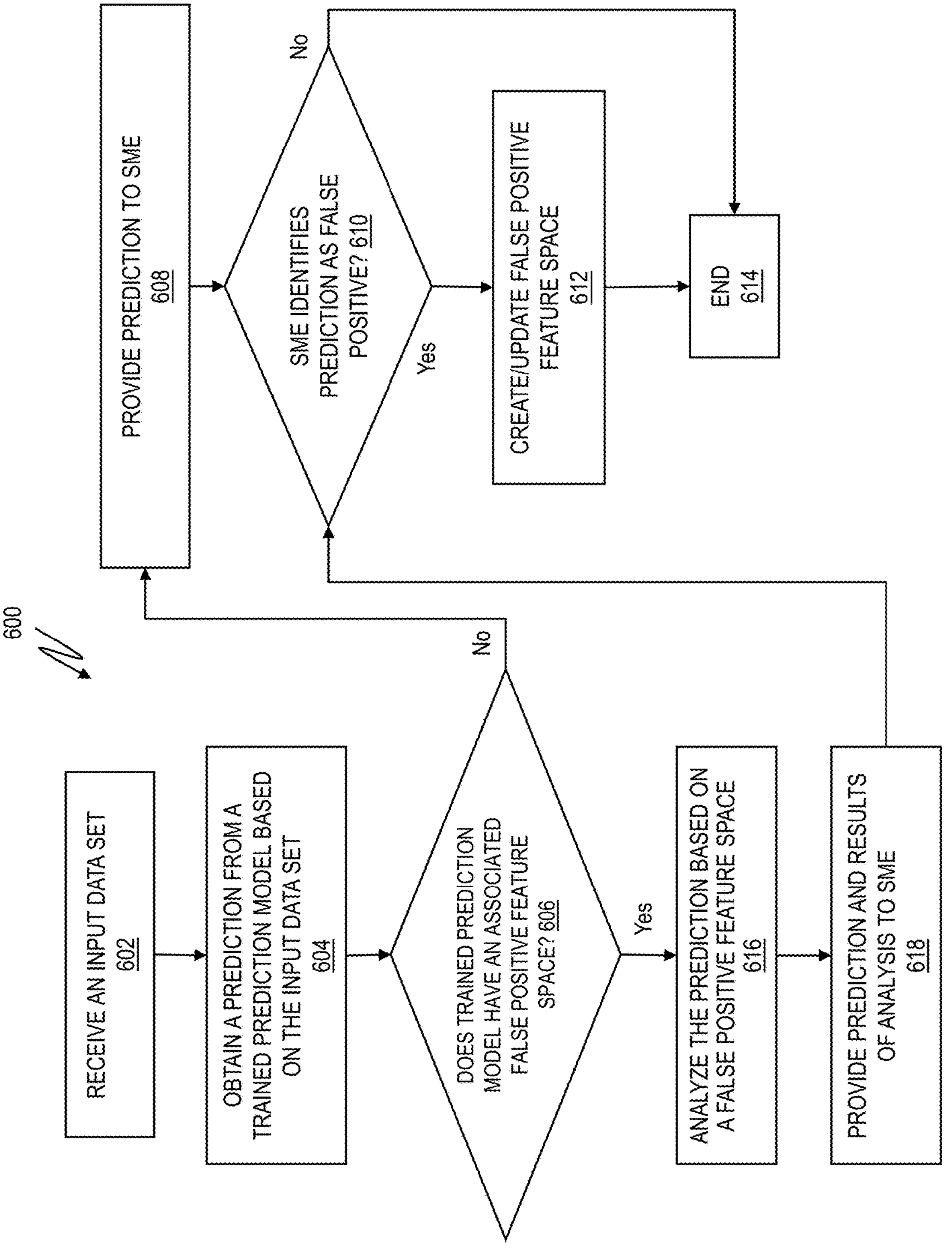
FIG. 6 is a flowchart of another method for identifying anomalies in a trained prediction model in accordance with one or more embodiments of the present invention.

Referring now to FIG. 6, a flowchart of a method 600 for identifying anomalies in a trained prediction model in accordance with one or more embodiments of the present invention is shown. As shown at block 602, the method 600 begins by receiving an input data set. Next, at block 604, the method 600 includes obtaining a prediction from a trained prediction model based on the input data set. In exemplary embodiments, the trained prediction model is configured to create a primary goal prediction and a secondary prediction based on the input data set. Next, as shown at decision block 606, the method 600 includes determining whether the trained prediction model has an associated false positive feature space. Based on a determination that the trained prediction model does not have an associated false positive feature space, the method 600 proceeds to block 608 and provides the prediction to a subject matter expert (SME). In exemplary embodiments, providing the prediction to a subject matter expert also includes providing the input data set to the SME. Based on a determination that the trained prediction model has an associated false positive feature space, the method 600 proceeds to block 616 and analyzes the prediction based on a false positive feature space. Next, as shown at block 618, the prediction and the results of the analysis are provided to the SME.

Next, as shown at decision block 610, the method 600 includes determining whether the SME identifies the prediction as a false positive. If the SME identifies the prediction as a false positive, the method 600 proceed to block 612 and a false positive feature space is created or updated. In exemplary embodiments, a false positive contour for the prediction is created based on the input data set and the false positive contour is added to a false positive feature space for the trained prediction model. In exemplary embodiments, the false positive contour is created based on one or more features extracted from the data set. In one embodiment, the one or more features are identified by the subject matter expert. If the SME does not identify the prediction as a false positive, the method 600 proceeds to block 614 and ends.

In exemplary embodiments, the prediction is compared to an existing false positive feature space for the trained prediction model prior to providing the prediction to the subject matter expert. In one embodiment, the prediction is provided to the subject matter expert with an analysis of the comparison of the prediction to the false positive feature space.

In exemplary embodiments, the prediction includes a primary prediction and a secondary prediction, wherein the primary prediction is a binary value, and the secondary prediction is a numerical value associated with the binary value. In one example, the primary prediction is a credit approval or disapproval decision, and the secondary prediction includes a credit limit amount. In another example, the primary prediction is a binary value that indicates whether a patient is predicted to have a specified medical condition and the secondary prediction includes a confidence score associated with the prediction.

In exemplary embodiments, the trained prediction model goes through the entire lifecycle of the model, which enables trained prediction model to evaluate its previous decisions based on target goals. The system is further configured to maintain a false positive feature space that is configured to evaluate positive predictions, identify false positive predictions, and highlight reasons for the false positive predictions. The false positive feature space is created based on identified false positive predictions through manual (intervention of SME) or autonomous (through metrics like distance, etc.) processes. In exemplary embodiments, for every new decision that falls in the false positive feature space, the system notifies the SME and suggests additional feature sets to be added to the false positive feature space.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for identifying anomalies in a trained prediction model, the method comprising:

receiving an input data set;

obtaining a prediction from the trained prediction model based on the input data set;

receiving, from a subject matter expert, a determination that the prediction is a false positive;

creating a false positive contour based on the input data set;

creating or updating, autonomously, using one or more metrics, a false positive feature space for the trained prediction model, wherein the creating or updating includes adding the false positive contour to the false positive feature space, and wherein the false positive feature space is configured to evaluate positive predictions, identify false positive predictions, and highlight reasons for the false positive predictions;

obtaining a subsequent positive prediction from the trained prediction model;

analyzing the subsequent positive prediction using the false positive feature space before providing the subsequent positive prediction to the subject matter expert; and providing the subsequent positive prediction and results of the analyzing to the subject matter expert.

2. The method of claim 1, wherein the false positive contour is created based on one or more features extracted from the input data set.

3. The method of claim 2, wherein the one or more features are identified by the subject matter expert.

4. The method of claim 1, further comprising determining whether a feature set checklist associated with the false positive feature space includes the false positive contour associated with the false positive predictions.

5. The method of claim 4, further comprising, in response to determining that the feature set checklist does not include the false positive contour, adding, to a datastore, the feature set checklist associated with the false positive predictions.

6. The method of claim 1, wherein the prediction obtained from the trained prediction model based on the input data set includes a primary prediction and a secondary prediction.

7. The method of claim 6, wherein the primary prediction is a binary value and the secondary prediction is a numerical value associated with the binary value.

8. A computing system having a memory having computer readable instructions for identifying anomalies in a trained prediction model and one or more processors for executing the computer readable instructions, the computer readable instructions controlling the one or more processors to perform operations comprising:

receiving an input data set;

obtaining a prediction from the trained prediction model based on the input data set;

receiving, from a subject matter expert, a determination that the prediction is a false positive;

creating a false positive contour based on the input data set;

creating or updating, autonomously, using one or more metrics, a false positive feature space for the trained prediction model, wherein the creating or updating includes adding the false positive contour to the false positive feature space, and wherein the false positive feature space is configured to evaluate positive predictions, identify false positive predictions, and highlight reasons for the false positive predictions;

obtaining a subsequent positive prediction from the trained prediction model;

analyzing the subsequent positive prediction using the false positive feature space before providing the subsequent positive prediction to the subject matter expert; and providing the subsequent positive prediction and results of the analyzing to the subject matter expert.

9. The computing system of claim 8, wherein the false positive contour is created based on one or more features extracted from the input data set.

10. The computing system of claim 9, wherein the one or more features are identified by the subject matter expert.

11. The computing system of claim 8, wherein the operations further comprise determining whether a feature set checklist associated with the false positive feature space includes the false positive contour associated with the false positive prediction.

12. The computing system of claim 11, wherein the operations further comprise, in response to determining that the feature set checklist does not include the false positive contour, adding, to a datastore, the feature set checklist associated with the false positive predictions.

13. The computing system of claim 8, wherein the prediction obtained from the trained prediction model based on the input data set includes a primary prediction and a secondary prediction.

14. The computing system of claim 13, wherein the primary prediction is a binary value and the secondary prediction is a numerical value associated with the binary value.

15. A computer program product comprising a computer readable storage medium having program instructions embodied therewith for identifying anomalies in a trained prediction model, the program instructions executable by a processor to cause the processor to perform operations comprising:

receiving an input data set;

obtaining a prediction from the trained prediction model based on the input data set;

receiving, from a subject matter expert, a determination that the prediction is a false positive;

creating a false positive contour based on the input data set;

creating or updating, autonomously, using one or more metrics, a false positive feature space for the trained prediction model, wherein the creating or updating includes adding the false positive contour to the false positive feature space, and wherein the false positive feature space is configured to evaluate positive predictions, identify false positive predictions, and highlight reasons for the false positive predictions;

obtaining a subsequent positive prediction from the trained prediction model;

analyzing the subsequent positive prediction using the false positive feature space before providing the subsequent positive prediction to the subject matter expert; and providing the subsequent positive prediction and results of the analyzing to the subject matter expert.

16. The computer program product of claim 15, wherein the false positive contour is created based on one or more features extracted from the input data set.

17. The computer program product of claim 16, wherein the one or more features are identified by the subject matter expert.

18. The computer program product of claim 15, wherein the operations further comprise determining whether a feature set checklist associated with the false positive feature space includes the false positive contour associated with the false positive predictions.

19. The computer program product of claim 18, wherein the operations further comprise, in response to determining that the feature set checklist does not include the false positive contour, adding, to a datastore, the feature set checklist associated with the false positive predictions.

20. The computer program product of claim 15, wherein the prediction obtained from the trained prediction model based on the input data set includes a primary prediction and a secondary prediction.

* * * * *